United States Patent [19]

Bost

[11] Patent Number: 4,845,395

[45] Date of Patent: Jul. 4, 1989

[54] CERAMIC CORE COMMUTATOR FOR A ROTARY ELECTRIC MACHINE

[75] Inventor: Edouard Bost, Dijon, France

[73] Assignee: Alsthom, France

[21] Appl. No.: 190,910

[22] Filed: May 4, 1988

[30] Foreign Application Priority Data

May 4, 1987 [FR] France ................................ 87 06240

[51] Int. Cl.[4] ........................ H02K 1/06; H01R 43/08; B23K 31/06

[52] U.S. Cl. ....................................... 310/233; 29/597; 228/122; 228/238; 310/42

[58] Field of Search .................. 29/597; 228/120, 121, 228/122, 123, 238; 310/42, 233, 236

[56] References Cited

U.S. PATENT DOCUMENTS 3,766,634 10/1973 Babcock et al. .................... 228/188
3,777,367 12/1973 Kalagidis .............................. 29/597
3,781,981 1/1974 Miura et al. .......................... 29/597
4,500,383 2/1985 Kashiwagi et al. ................. 228/124
4,505,418 3/1985 Neidig et al. ........................ 228/124
4,603,474 8/1986 Gobrecht et al. ................... 310/233
4,746,054 5/1988 Moats et al. ........................ 228/124

FOREIGN PATENT DOCUMENTS 184008 4/1984 Japan .................................. 310/233

*Primary Examiner*—Patrick R. Salce
*Assistant Examiner*—D. L. Rebsch
*Attorney, Agent, or Firm*—Sughrue, Mion, Zinn, Macpeak & Seas

[57] ABSTRACT

A commutator for a rotary electric machine, and a method of manufacturing said commutator.

The commutator comprises a ceramic support and metal segments, the support constituted by a plurality of parts (1, 2) which are mutually separated by respective axial gaps (8) and bonded to the ceramic by a copper oxide eutectic surface.

The invention is applicable to electric machines including commutators.

5 Claims, 3 Drawing Sheets

CERAMIC CORE COMMUTATOR FOR A ROTARY ELECTRIC MACHINE

The present invention relates to a commutator for a rotary electric machine, and to a method of manufacturing said commutator.

Proposals have already been made to make a commutator of the type comprising:

a ceramic support having an outside surface constituting a first conical surface of revolution about an axis; and metal segments disposed side-by-side parallel to said axis around the outside surface of the support in such a manner that any two adjacent segments are separated by a space, each segment being fixed to the support by a metal layer connecting a fixing surface of the segment to the outside surface of the support, the fixing surfaces of the segments being disposed on a second conical surface of revolution around said axis, said second conical surface being substantially parallel to said first conical surface.

In this commutator, the support may be constituted by a single substantially tubular piece of alumina, and the metal segments are generally made of copper, with the metal layer fixing the segments on the support being either a copper and copper oxide eutectic, or else a metal brazing substance.

Such a commutator may be made by a method comprising the following operations:

a metal ring having a conical inside surface of revolution about an axis is assembled with a ceramic supports having a conical outside surface having the same taper angle as said inside surface of the ring, such as to put the conical surfaces of the support and the ring into contact about said axis;

said assembly is placed in an oven with said axis being vertical, with the virtual apex of the conical surfaces of the support and of the ring being up, with the support being fixed relative to the bottom of the oven, and with the ring resting freely on the outside surface of the support;

the temperature of the oven is raised to a sufficiently high value in order to ensure that after cooling the ring is fixed on the support; and the ring is machined in such a manner as to obtain commutator segments in radial planes.

In this method, the temperature of the oven may be raised to a value of about 1075° C. in order to form a eutectic of the ring metal and of an oxide of said metal between the ring and the support, said eutectic constituting, after cooling, a metal layer for fixing the ring on the support. It is also possible, prior to assembly, to metallize the outside surface of the support and to interpose a sheet of brazing metal between the support and the ring, with a rise in the temperature of the oven to about 850° C. then sufficing to melt the brazing metal.

The commutator made in this way can withstand high operating temperatures, of the order of 200° C. to 300° C. However, it is observed in some cases that the commutator is not mechanically strong enough for high speeds of rotation: at high speed the copper segments become detached, taking away a layer of ceramic.

This is due essentially to the surface of the ceramic support becoming fragile under the effect of the axial stresses which occur during cooling to a temperature below that at which the materials in question adhere to one another, and due to the different coefficients of expansion of said materials.

These stresses increase with increasing length of the geometrical generator lines in contact.

The object of the present invention is to mitigate this drawback and provide a commutator which is capable both of operating at high temperatures and of mechanically withstanding high speeds of rotation.

The present invention provides a rotary electric machine commutator of the type specified above, and characterized in that the support comprises a plurality of ceramic parts disposed along said axis, with any two adjacent parts being separated from each other by an axial gap, thereby reducing the lengths of the generator lines in contact between the support and the ring.

In various embodiments, a commutator in accordance with the invention may additionally have the following characteristics:

the height of the conical surface of each ceramic part in contact with the metal of the segments and as measured parallel to the axis is less than 60 mm;

one of said two juxtaposed parts further includes an outside cylindrical surface of revolution about said axis and the other of said two juxtaposed parts further includes an inside surface of revolution about said axis, said outside and inside cylindrical surfaces co-operating so as to be capable of sliding axially over each other;

said metal layer is a eutectic of the metal of the segments and of an oxide of said metal; and said metal layer is a sheet of brazing metal.

The present invention also provides a method of manufacturing a commutator for a rotary electric machine, the method being characterized in that it comprises the following operations:

a metal ring having a conical inside surface of revolution about an axis is assembled with a plurality of ceramic parts each having a conical outside surface having the same taper angle as said inside surface of the ring, such as to put the outside surfaces of the parts into contact with the inside conical surface of the ring, with the parts then being mutually separated by respective axial gaps;

said assembly is placed in an oven with said axis being vertical, with the virtual apex of the conical surfaces of the ring and of the parts being downwards, with the ring being fixed relative to the bottom of the oven, and with said parts resting freely on the inside surface of the ring;

the temperature of the oven is raised to a sufficiently high value in order to ensure that after cooling the parts are fixed on the ring; and the ring is machined in such a manner as to obtain commutator segments in radial planes.

In this method, the temperature of the oven may be raised to a value which is high enough to form a layer of a eutectic of the metal of the ring and of an oxide of said metal between the ring and the ceramic parts.

In another implementation of this method, prior to making said assembly, metallization layers are deposited on the conical outside surfaces of the ceramic parts and a brazing sheet is interposed between the conical inside surface of the ring and the layers of metallization on the parts, with the value of the temperature to which the oven is raised being sufficient to melt the brazing sheet.

Particular implementations of the subject matter of the present invention are described below, by way of example, with reference to the accompanying drawings, in which.

Figure 1:
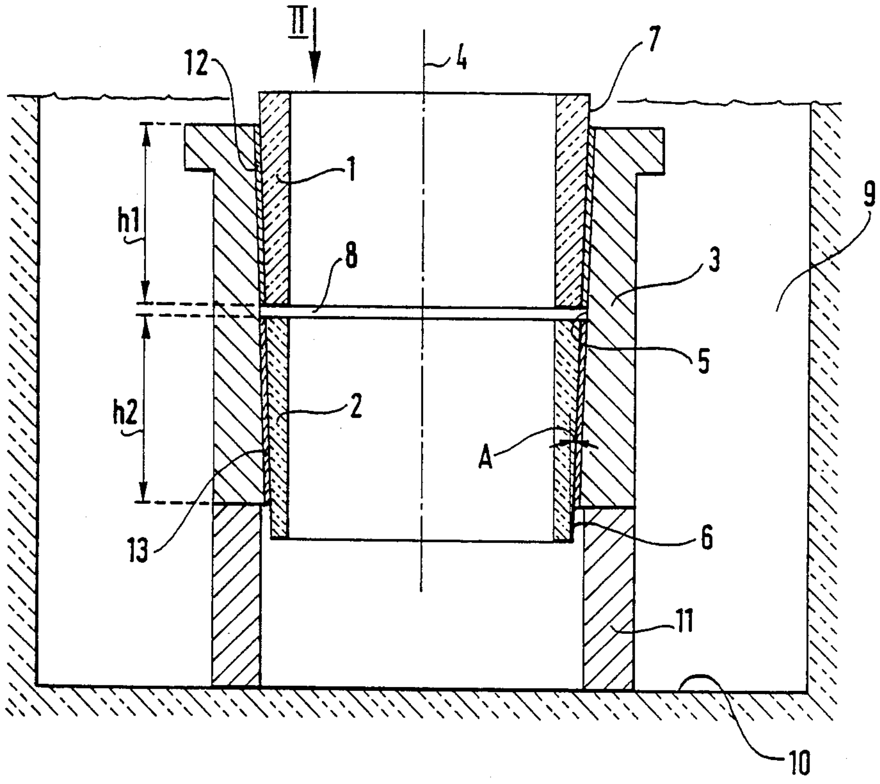
FIG. 1 is a section on an axial plane through an assembly of two ceramic parts and a metal ring, said assembly being placed in an oven and used in an implementation of the method in accordance with the invention.

As shown in FIG. 1, the method of manufacturing a commutator begins with assembling two ceramic parts 1 and 2 with a metal ring 3 which is preferably made of copper.

The ring 3 is a body of revolution about an axis 4 and has a conical inside surface 5. The value of the angle at the apex of the cone is not critical. The angle A between the axis 4 and a generator line of the cone may lie, for example, in the range arctan 1/20 to arctan 1/50.

The ceramic part 2 is preferably made of alumina and has a conical outside surface 6 with the same taper angle A as the conical inside surface 5 of the ring 3. The part 2 is a body of revolution and is disposed coaxially inside the ring 3 so that the conical surface 6 of said part is in contact with the surface 5 of the ring 3 over a height h2.

The ceramic part 1 is also made of alumina and has a conical outside surface 7 with the same taper angle A as the inside surface 5 of the ring 3. This part 1 is also a body of revolution and is disposed coaxially inside the ring 3 so that its conical surface 7 comes into contact with the conical surface 5 of the part 3 over a height h1.

The conical surfaces 6 and 7 are machined in such a manner that once assembled in the ring 3, the parts 6 and 7 are separated from each other by an axial gap 8 which is about 1 mm to 2 mm across.

The assembly is disposed in an oven 9 with the axis 4 extending vertically and with the ring 3 standing on the bottom 10 of the oven 9 via a cylindrical support 11 made of refractory steel, for example. In addition, the apex of the contact cone between the ring 3 and the parts 1 and 2 is situated downwardly, beneath the ring 3. As a result the parts 1 and 2 rest on the conical surface 5 of the ring 3.

In a first implementation, the ring 3 is initially surface oxidized (e.g. by heating in air to 400° C. for three minutes), is assembled as mentioned above, and is placed in an oven containing an inert gas together with 0.05% to 0.5% oxygen.

The temperature of the oven is raised progressively.

By virtue of the difference in the expansion of the copper and of the ceramic, the parts 1 and 2 move down a little under the effect of gravity during heating, with the size of the axial gap 8 remaining substantially unchanged. When the temperature reaches 1065° C., the layer of copper oxide lying between the ring 3 and the parts 1 and 2 transforms into a liquid coating constituted by a eutectic of copper and copper oxide, said coating having very high adherence on the ceramic.

The temperature of the oven is raised to 1075° C., and is then lowered progressively so as to solidify the metal coating and form two metal layers 12 and 13 each constituted by said eutectic. The cooling clamps the ring 3 onto the ceramic parts 1 and 2. This clamping compresses the metal layers 12 and 13, hereby ensuring that the ring 3 is properly fixed on the alumina parts 1 and 2.

The method of manufacturing a commutator includes a subsequent step of machining the ring 3 so as to obtain commutator segments in radial planes.

This machining may be performed by any appropriate means, for example milling, using a wire saw, or wire electro-erosion.

Figure 2:
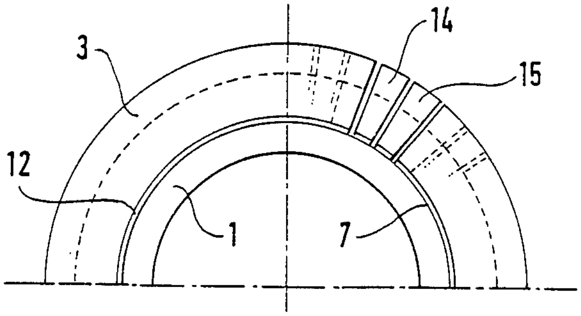
FIG. 2 is an axial view of the FIG. 1 assembly shown in part during the operation of heating the oven, and in part during the operation of separating the segments of the commutator.

The lefthand side of FIG. 2 shows the assembly during the operation of fixing the ring on the ceramic parts. The righthand side of FIG. 2 shows the first segments 14 and 15 cut from the ring 3 by slots extending along radial planes.

The commutator is then machined to its design dimensions.

A commutator made by the above-described method using two separate ceramic parts providing connections over axial heights h1 and h2 has the advantage of much higher mechanical strength at high speeds of rotation than a prior art commutator made using a single ceramic part with connections extending over an axial height of h1 +h2. It has been observed that the force required per unit area to tear off the segments is three times greater for a commutator in accordance with the invention using two separate ceramic parts each extending over a height of 40 mm, then for a prior art commutator as mentioned above made using a single ceramic part extending over a height of 80 mm.

In the method of the invention, the axial height h1 and h2 of the conical surface of each ceramic part that is in contact with the metal of the ring should preferably be less than 60 mm. The incerased mechanical strength of a commutator in accordance with the invention can be explained by the following considerations: the reduction in said axial length reduces the longitudinal stresses set up in the ring during cooling in the oven, which stresses are transmitted to the ceramic by the metal fixing layer. The reduction in these longitudinal stresses increases the strength of the ceramic for withstanding centrifuging when the commutator is rotated at high speed.

Figure 3:
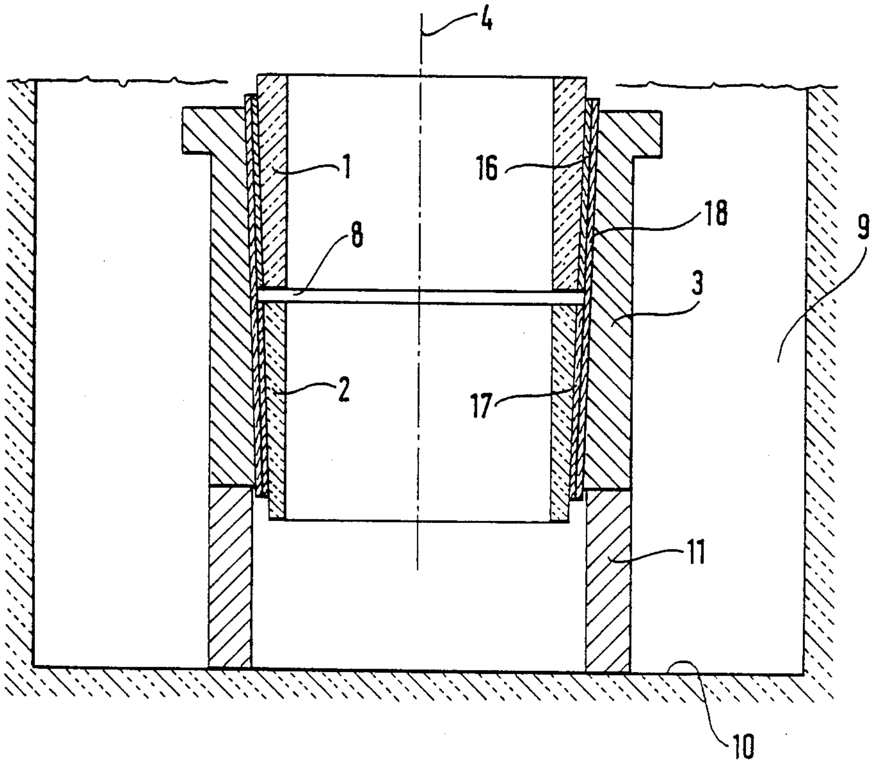
FIG. 3 is a section on an axial plane through another type of assembly analogous to that shown in FIG. 1, placed in an oven and used in another implementation of the method of the invention.

In a second implementation, as shown in FIG. 3, an assembly still comprises two ceramic parts 1 and 2 and a metal ring 3 analogous to those shown in FIG. 1, but in this case the ring 3 is not previously surface oxidized.

Prior to assembly, respective metallization layers 16 and 17 are deposited on the cylindrical surfaces of the two ceramic parts, and a brazing sheet 18 is interposed between said layers and the ring 3.

Metallization is performed in conventional manner, for example by depositing a molybdenum-manganese paste and then baking at 1600° C. under lamp hydrogen, followed by electrolytically depositing 10 microns of copper or nickel, and then diffusion annealing at around 900° C. to 1000° C. under dry hydrogen.

For the purpose of clarifying the drawing, the thicknesses of the metallization layers and of the brazing sheet have been greatly exaggerated.

As in the FIG. 1 case, the assembly is placed in an oven 9, with the ring 3 standing on a support 11 and with the apex of the cone of the assembly being directed downwardly. The temperature of the oven is raised so as to melt the brazing sheet 18. By virtue of differential expansion, the parts 1 and 2 move progressively downwards while maintaining good contact between the metallization layers and the brazing sheet, and the size of the axial gap 8 between the parts 1 and 2 remains substantially unchanged.

After cooling, excellent fixing is obtained between the ring 3 and the parts 1 and 2.

The method of manufacturing the commutator finally includes the operation of separating the segments in the manner described for the FIG. 1 assembly.

Figure 4:
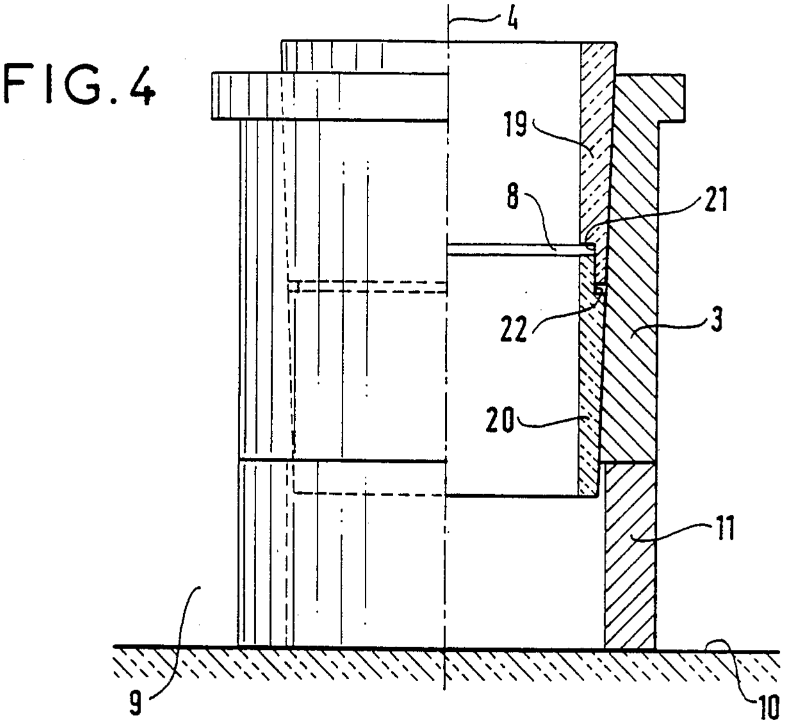
FIG. 4 is a view which is partially in section on an axial plane showing an assembly analogous to the FIG. 1 assembly but using a variant embodiment of the ceramic parts.
Figure 5:
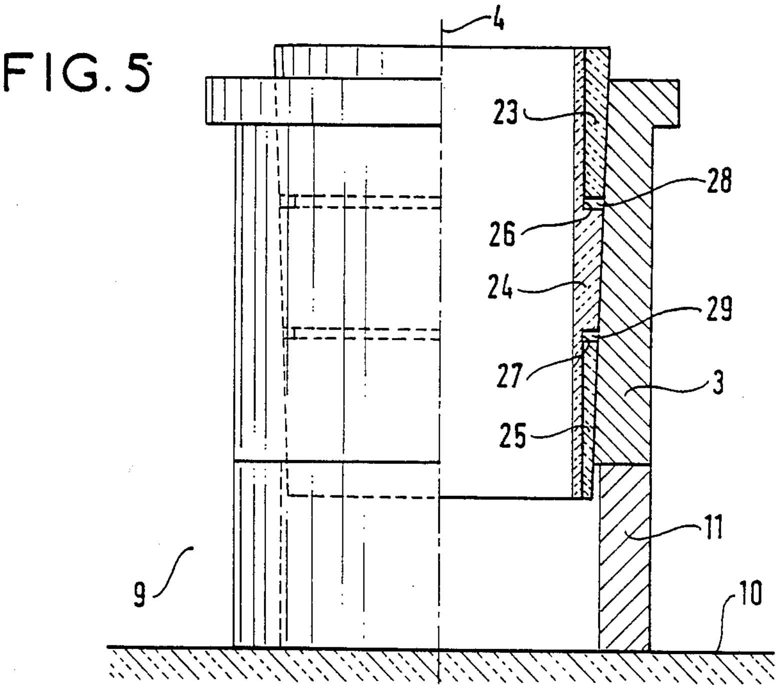
FIG. 5 is a view partially in section on an axial plane showing an assembly using three ceramic parts based on a principle similar to that shown in FIG. 4.

The assemblies shown in FIGS. 4 and 5 are used in commutator manufacturing methods analogous to that shown in FIG. 1, but which differ therefrom in the number and the shape of the ceramic parts.

The assembly shown in FIG. 4 still comprises two ceramic parts 19 and 20. However, in addition to its conical surface, the part 20 has an outside cylindrical surface 22 of revolution about the axis 4 while the part 19 includes an inside cylindrical surface 21 of revolution about the axis 4 in addition to its conical surface. The surfaces 21 and 22 slide over each other so as to allow a small amount of mutual axial displacement between the two parts, for example while the oven is being heated, but with said displacement under no circumstances allowing the axial gap 8 between the two parts to disappear.

The assembly shown in FIG. 5 has three ceramic parts 23, 24, and 25. The middle part 24 has two outside cylindrical surfaces 26 and 27 on either side of its conical surface, and these cylindrical surfaces co-operate with respective inside cylindrical surfaces of the parts 23 and 25 level with the conical surfaces of these two parts. As in the cases shown in FIGS. 1, 3, and 4, axial gaps such as 28 and 29 are maintained between pairs of adjacent parts, and said gaps are about 1 mm to 2 mm across. Preferably, the number of ceramic parts in a commutator is selected in such a manner that the axial extent of each part coming into contact with the metal of the ring is less than 60 mm.

I claim:

1. A commutator for a rotary electric machine, the commutator comprising:

a ceramic support having an outside surface constituting a first conical surface of revolution about an axis; and metal segments disposed side-by-side parallel to said axis around the outside surface of the support in such a manner that any two adjacent segments are separated by a space, each segment being fixed to the support by a metal layer connecting a fixing surface of the segment to the outside surface of the support, the fixing surfaces of the segments being disposed on a second conical surface of revolution around said axis, said second conical surface being substantially parallel to said first conical surface;

characterized in that the support comprises a plurality of ceramic parts (1, 2) disposed along said axis (4), with any two adjacent parts (1, 2) being separated from each other by an axial gap (8).

2. A commutator according to claim 1, characterized in that the height (h1, h2) of the conical surface (7, 6) of each ceramic part (1, 2) in contact with the metal of the segments and as measured parallel to the axis (4) is less than 60 mm.

3. A commutator according to claim 1, characterized in that one (20) of said two juxtaposed parts (19, 20) further includes an outside cylindrical surface of revolution about said axis (4) and that the other (19) of said two juxtaposed parts further includes an inside surface of revolution (21) about said axis (4), said outside and inside cylindrical surfaces (22, 21) cooperating so as to be capable of sliding axially over each other.

4. A commutator according to claim 1, characterized in that said metal layer (12, 13) is a eutectic of the metal of the segments and of an oxide of said metal.

5. A commutator according to claim 1, characterized in that said metal layer is a sheet of brazing metal (16, 17, 18).

* * * * *